United States Patent [19]

Lee

[11] Patent Number: 4,731,570

[45] Date of Patent: Mar. 15, 1988

[54] ELECTRICAL DRIVE CIRCUIT FOR A VARIABLE-SPEED SWITCHED RELUCTANCE MOTOR

[75] Inventor: Peter W. Lee, Willingham, England

[73] Assignee: Caterpillar Inc., Peoria, Ill.

[21] Appl. No.: 943,213

[22] PCT Filed: Sep. 8, 1986

[86] PCT No.: PCT/US86/01846

§ 371 Date: Sep. 8, 1986

§ 102(e) Date: Sep. 8, 1986

[87] PCT Pub. No.: WO87/01530

PCT Pub. Date: Mar. 12, 1987

[30] Foreign Application Priority Data

Sep. 9, 1985 [GB] United Kingdom ............... 8522323

[51] Int. Cl.⁴ .............................................. H02P 8/00
[52] U.S. Cl. ..................................... 318/696; 318/685; 318/701
[58] Field of Search ............... 318/696, 685, 701, 138, 318/258

[56] References Cited

U.S. PATENT DOCUMENTS 4,387,326  6/1983  Ray et al. ........................ 318/138
4,500,824  2/1985  Miller .............................. 318/701

Primary Examiner—William M. Shoop, Jr.
Assistant Examiner—Saul M. Bergmann
Attorney, Agent, or Firm—Stephen L. Noe

[57] ABSTRACT

An electrical drive circuit for a variable-speed switched reluctance motor having a bifilar winding is provided. First, second, and third thyristor switches (5,7,10) each having respective firing circuits (6,8,11) are associated with the motor. A commutation capacitor device (9) is associated with one of the thyristor switches (5,7,10). A sensing means (33) determines the direction of current flow through the commutation capacitor device (9), and a control system (20) prevents the first and third thyristor switches (5,10) from conducting when the second thyristor switch (7) is conducting and prevents the first and second thyristor switches (5,7) from conducting when the third thyristor switch (10) is conducting.

6 Claims, 7 Drawing Figures

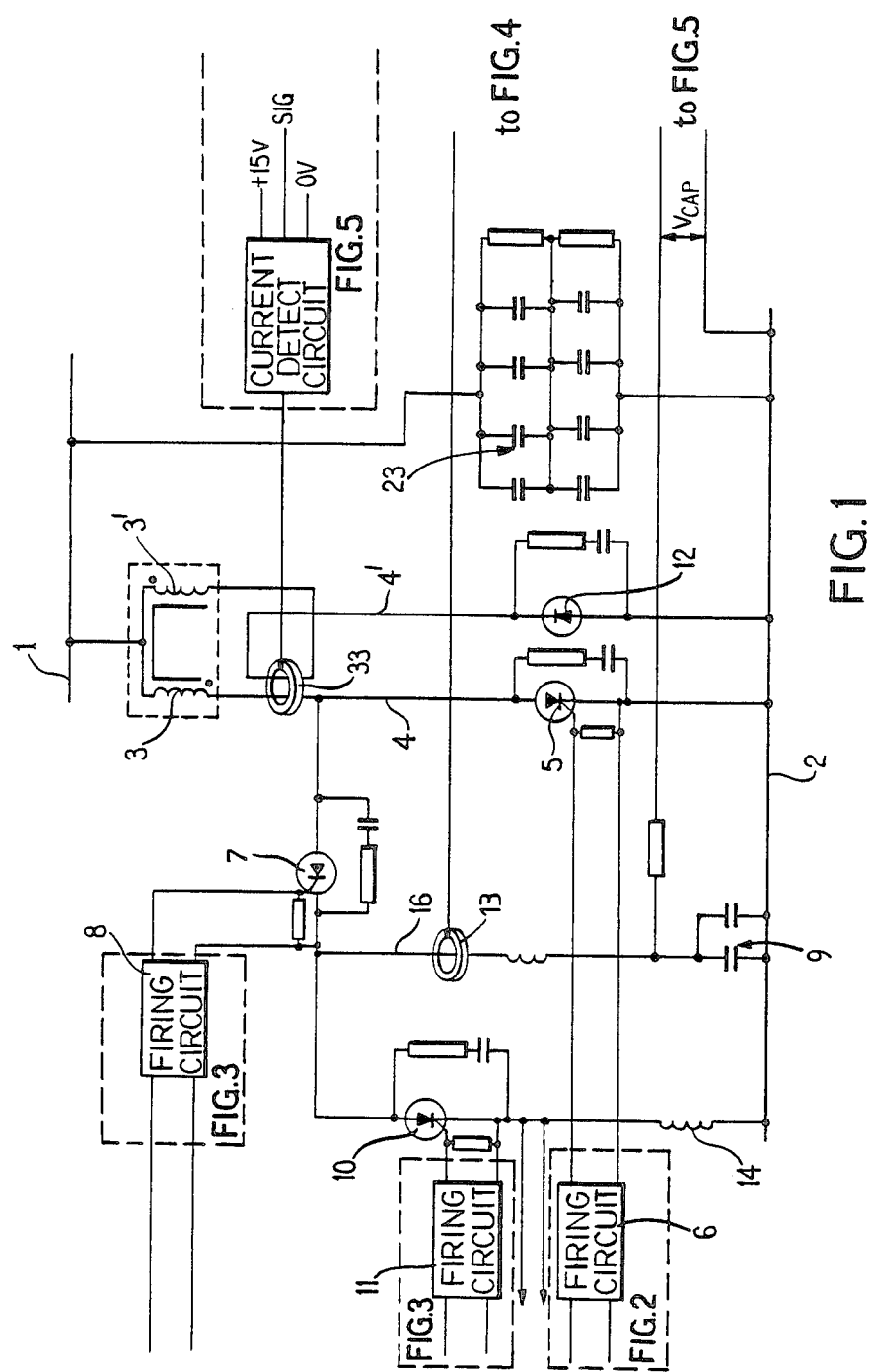

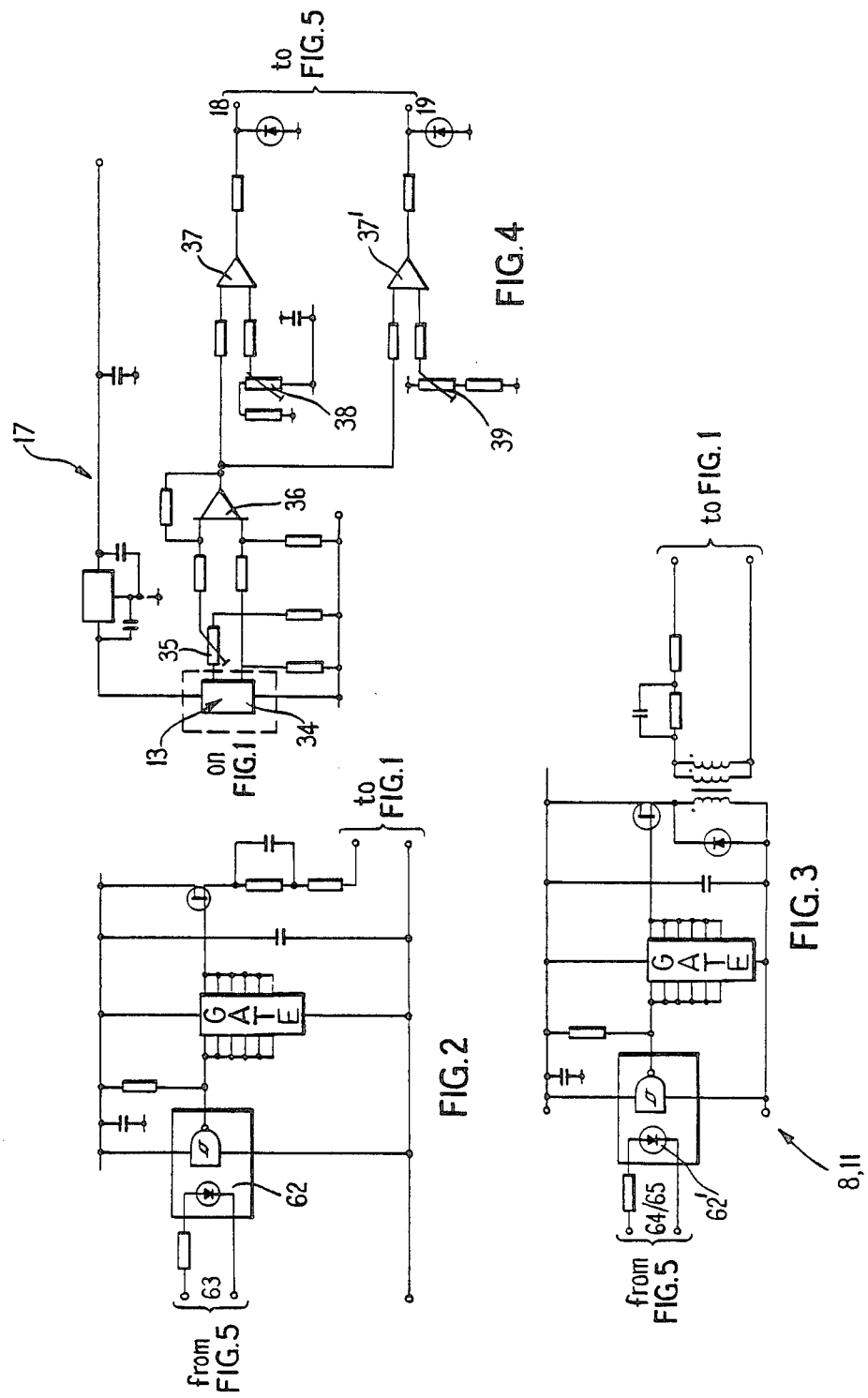

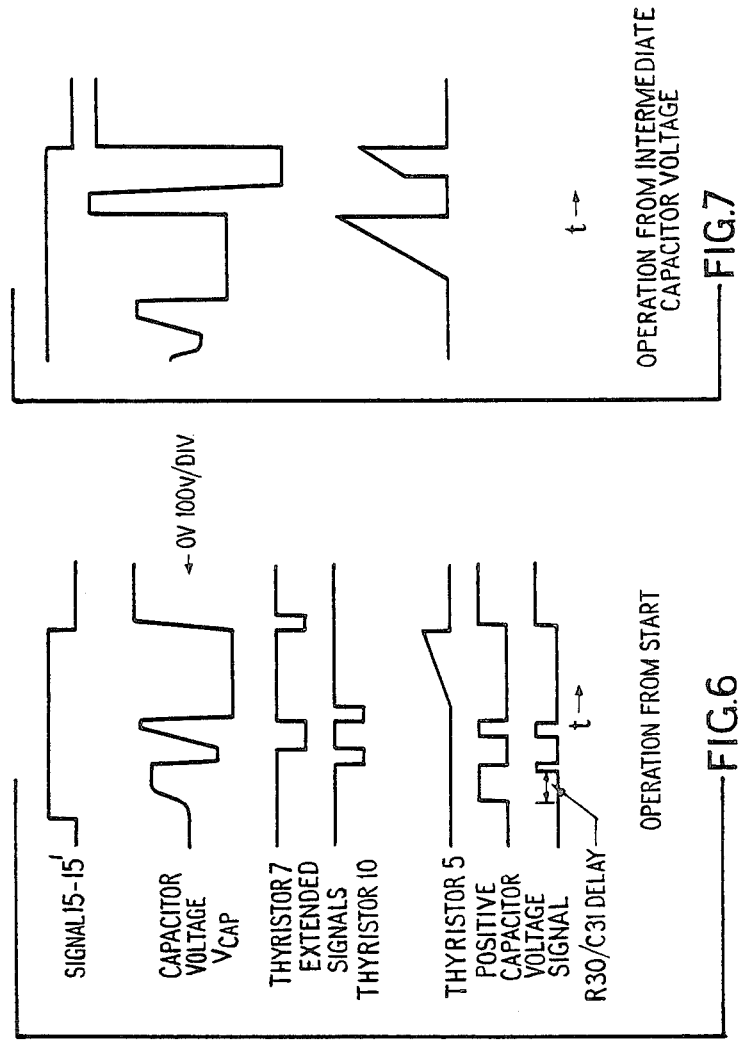

ELECTRICAL DRIVE CIRCUIT FOR A VARIABLE-SPEED SWITCHED RELUCTANCE MOTOR

DESCRIPTION

1. Technical Field

The present invention relates to electrical drive circuits for motors and, more particularly, to a drive circuit for a variable-speed switched reluctance motor having a bifilar winding, that is to say main and auxiliary windings integrally wound on the motor.

2. Background Art

In recent years considerable interest has been shown in the use of switched-reluctance motor drives as a replacement for conventional induction motor drives. The former have been shown to be able to achieve unusually good combinations of high power output and system efficiency while having costs considerably below those of AC-motor systems. Variable-speed switched reluctance machines are also often able to provide a range and quality of control usually only associated with the best DC-motor systems, while providing a range of substantial operational advantages in terms of reliability and robustness.

Various drive circuits are known and, in particular, drive circuits using thyristor switches have been utilized to provide the desired commutation control of the individual phases of the motor. Each phase has its own respective drive circuit and these are identical with one another. Conventional circuits utilize a commutation capacitor which is initially charged to a supply voltage by the firing of a first thyristor switch which is then switched off, a second thyristor switch being closed to allow current produced by the capacitor to flow through the load winding of the motor. As there are advantages in using bifilar wound motors, modified circuits have been utilized, but those studied have suffered from various disadvantages.

The present invention is directed to overcoming one or more of the problems as set forth above.

DISCLOSURE OF THE INVENTION

According to the present invention, an electrical drive circuit for a variable-speed switched reluctance motor connectable to a DC power source is provided. The motor has a bifilar winding having a main winding and an auxiliary winding. The drive circuit includes first and second voltage/current lines for connection to the DC power source, one end of the main winding being connected to the first voltage/current line. A resonant reversal inductor is also included.

First, second and third thyristor switches each have a respective firing circuit for firing the thyristor switches to conduction. The first thyristor switch is connected between the second end of the main winding and the second voltage/current line. The second and third thyristor switches are connected in series with the inductor between the second end of the main winding and the second voltage/current line, in parallel with the first thyristor switch. A commutation/snubber capacitor device is connected in parallel with the third thyristor switch between the second thyristor switch and the second voltage/current line. Means are included for sensing the direction of current flow through the commutation/snubber capacitor device, thereby to sense current flow through either the second or the third thyristor switches.

Finally, control means are provided for preventing the first and third thyristor switches from conducting when the second thyristor switch is conducting and to prevent the first and second thyristor switches from conducting when the third thyristor switch is conducting, the control means being connected to the sensing means and to the firing circuits.

BRIEF DESCRIPTION OF THE DRAWINGS

One example of one phase of a drive circuit according to the present invention will now be described with reference to the accompanying drawings in which:

FIG. 1 shows the basic arrangement of a drive circuit for one phase (in a 3-phase machine there will be two further identical circuits);

FIG. 2 illustrates a first thyristor firing circuit;

FIG. 3 illustrates a second thyristor firing circuit;

FIG. 4 illustrates a current sensing circuit;

FIGS. 6 and 7 are timing diagrams for various signals of the circuit.

BEST MODE FOR CARRYING OUT THE INVENTION

Figure 5:
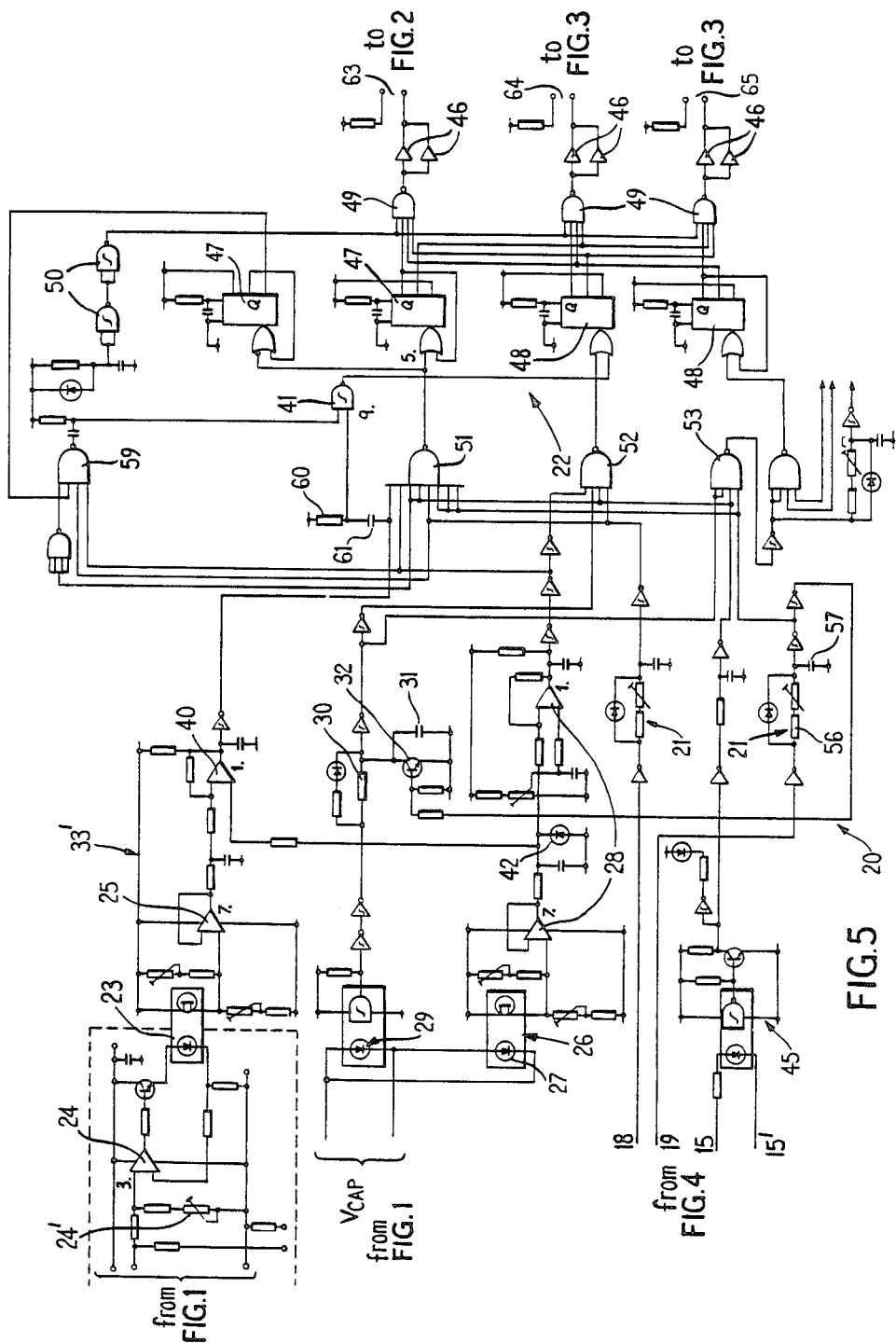
FIG. 5 illustrates a control means for the thyristor firing circuits.

A battery (not shown) provides a DC power source at 72 volts to supply current to a pair of lines 1,2. A main winding 3 and an auxiliary winding 3' are wound in a bifilar configuration on the motor. Between the main winding 3 and the line 2, a first thyristor switch 5 is provided, the switch 5 being able to conduct, as shown, in the direction from the main winding to the line 2. A commutation diode 12 is provided in series with the auxiliary winding. A firing circuit 6 for the thyristor switch 5 is indicated schematically in FIG. 1 and in detail in FIG. 2. To the same end of the main winding 3 a second thyristor switch element 7 is connected, coupled between the main winding 3 and a commutation/snubber capacitor device 9. The thyristor switch element 7 has a firing circuit 8, shown schematically in FIG. 1 and in detail in FIG. 3. A bypass capacitor device 23 is also provided. A third thyristor switch element 10 is coupled between the second thyristor switch element 7 and the line 2 in parallel with the commutation/snubber capacitor device 9 and in series with an inductor 14. The third thyristor switch element 10 has a firing circuit 11 again shown schematically in FIG. 1 and in detail in FIG. 3.

In operation, the second thyristor switch 7 is fired first causing the main winding 3 and the commutation/snubber capacitor device 9 to "ring" with a half cycle sinusoidal current, the voltage across the commutation/snubber capacitor 9 peaking nominally at twice the battery voltage and being caused to remain at this peak voltage by the third thyristor switch element 10 being in the forward blocking condition.

The third thyristor switch 10 is then fired to reverse the voltage on the capacitor device 9, to a negative potential slightly less than its positive value (due to circuit losses), by means of the inductor 14, so that the capacitor 9 is negatively charged and ready for the commutation process. At this point, the noncyclic operation terminates and the operation hereafter follows the following cycle. The first thyristor switch 5 is fired causing load current to flow in the main winding 3. When the current in the main winding 3 has reached a predetermined value, then the second thyristor switch 7 is fired so that the principal current is diverted from the first thyristor switch element 5 which is turned off. The anode voltage of the first thyristor switch 5 increases to a positive value diverting current to the commutation/-snubber capacitor 9 via the second thyristor switch 7. By transformer action between the main 3 and auxiliary 3' windings, at a value of about twice the battery voltage, the commutation diode 12 conducts, returning the principal current to the supply.

The anode voltage of the first thyristor switch 5 continues to rise to a value of twice the battery voltage plus a voltage corresponding to the energy stored in the uncoupled leakage inductance of the machine and the supply conductors and when this energy is completely "snubbed" the second thyristor switch 7 naturally commutates off.

The circuit is then ready for the next cycle. It will be observed that the next cycle does not require the capacitor to be charged via the main winding as described initially.

It will be appreciated that second and third thyristor switches 7 and 10 provide, if fired together, a short circuit path for current between the lines 1 and 2, which is potentially damaging, and, accordingly, it is necessary to ensure that the first and third thyristor switches 5,10 cannot conduct when the second thyristor switch 7 is conducting and likewise to prevent the first and second thyristor switches 5,7 from conducting when the third thyristor switch 10 is conducting. To this end a Hall effect sensor 13 is provided, to supply a detected current signal (see FIG. 4) to a control means which determines the direction of the current and in turn provides signals inhibiting firing of the firing circuits of the three thyristor switch elements as appropriate. The Hall effect sensor 13 is located, in the example shown, around the conductor 16 between the second thyristor 7 and the capacitor 9 to sense current flow therethrough.

FIG. 4 illustrates a sensing circuit 17 which includes the Hall effect sensor 13 and a pair of bi-polar detectors 37,37' which determine the direction of current flow in the conductor 16, thus determining which of the second and third thyristor switches 7,10 is conducting. The outputs 18,19 are fed to the main circuit board (FIG. 5) and then via delay circuitry 21 in the control circuit 20 to appropriate logic circuitry 22 to ensure that the firing of the switches 5,7,10 is appropriately inhibited.

The firing conditions for the three thyristor switches 5,7,10 are as follows:

Switch 10 fires if:
 (a) Positive capacitor voltage is high;
 (b) Current through switch 7 is zero; and
 (c) Firing pulse is on.

Switch 7 fires primarily if:
 (a) Negative capacitor voltage is low;
 (b) Positive capacitor voltage is low;
 (c) Current through switch 10 is zero; and
 (d) Firing pulse is on.

Switch 5 fires if:
 (a) Current limit is off;
 (b) Negative capacitor voltage is high;
 (c) Current through switch 7 is zero;
 (d) Current through switch 10 is zero; and
 (e) Firing pulse is on.

Operation of the motor, its speed, etc. is controlled via a microprocessor (not shown) providing signal inputs at 15,15' in FIG. 5, which are fed into the logic circuitry 22 to determine, in accordance with the above, firing of the thyristor switches and hence motor control.

It is apparent from the circuit diagram that the shunt commutation route of the second thyristor switch element 7, tnird thyristor switch element 10, and inductor 14 constitutes an unrecoverable short circuit via the motor winding 3, should both devices be fired at the same time. From the above description of the circuit operation, it is also apparent that the charge condition of the capacitor device 9 is a critical element in the decision chain leading to the ultimate firing of the first thyristor switch element 5. To supervise the firing sequence, a number of decision elements are necessary:

1. A measurement of current flowing in the first thyristor switch element 5 (if current is flowing).
2. A measurement of the capacitor voltage and its polarity.
3. Current detection in the second thyristor switch element 7 and the third thyristor switch element 10.

With these elements, it is possible to interlock the power system such that the control processor will demand current into the motor only when the correct conditions exist within the power system. Supervision of the firing sequence and the resulting current amplitude is controlled within the power section. Unacceptable demands from the control processor are ignored until the correct conditions for the demand are available.

An OEM Hall effect current transducer 33 is used for measurement of current in the conductor 4 and hence, in the first thyristor switch element 5. A second loop 4' is passed through the current transducer 33 to determine the value of the decaying current in the auxiliary winding 3'. This loop is in the opposing direction which allows an undirectional current signal from the current transducer 33.

The peak value of current and the decayed value are principal control parameters for the microprocessor.

A separate power supply is used for the current transducer 4 and the output signal is fed directly to a current detector circuit 33' (FIG. 5).

To avoid noise and interaction between the microprocessor and the power electronics, an analog optical coupler 23 is used to transfer the current value to the logic PCB. FIG. 5 shows this coupling. A voltage to current converter 24 is used to convert the 0–10 volt transducer signal to 0–20 mA with a linear transfer characteristic.

The input signal is scaled by adjusting a variable resistor 24' to present 5 volts DC to pin 3 of converter 24. There are two reasons for this scaling, firstly 10 volts is too close to the input range of the amplifier/-converter 24, and also the current limit value may be varied by adjusting the resistor 24' during the test program. As a final adjustment, 1000 amperes gives 5 volts DC at the output of IC24, pin 7.

For capacitor voltage measurements, firstly a negative, analog opto-coupler 26 is used for this function, identical to the current measurement system. With the machine current switched off at 1000 amperes, then charge reversed, the maximum negative excursion is −600 volts and the feed resistor (not shown) to terminal C is 30 k . This produces a resultant current of 20 mA through the LED 26 and 10 volts at pin 7 of the comparator 28.

The comparator 28 pin 1 compares the negative voltage value with a preset reference level. This is set such that pin 1 is high if the actual negative voltage is greater than 100 volts DC and goes low if the actual voltage falls below 90 volts DC. Reference will be made to this function in the operating description.

For measuring positive capacitor voltage, a digital opto-coupler 29 is provided which has well defined transfer characteristics both in LED operating current to switch the device on and in the hysteresis to the off state. The current into the LED is fed by the same resistance, 30 K, as the negative voltage system. At approximately 55 volts DC, the output of the coupler 29 goes low, when the voltage falls to 40 volts DC, the output goes high. A delay is introduced into the signal by an R/C network 30,31, but only during the 1-0 transition. This delay can be reset by the transistor 32. The reason for this delay is made clear in the operating description.

Current detection in the second thyristor switch element 7 and the third thyristor switch element 10 is discussed with reference to FIG. 4.

To detect current in the second thyristor switch element 7 or the third thyristor switch element 10, the toroidal ferrite core 13 has the common connection from these devices passed through it on its way to the commutation capacitor 9. A slot is cut in the toroid and a linear Hall effect device 34 is potted in the slot. A resistance 35 is used to trim the DC offset of the device 34 to zero with no current flowing. A differential amplifier 36 with a gain of 10 is provided. In the common cable the second thyristor switch element current is positive and the third thyristor switch element current is negative—hence dual supply rails are used for the amplifier 36. Two simple comparators 37,37' are connected to the differential amplifier 35 output, one 37 with a positive threshold and one 37' negative. A single polarity signal is available at 18 and 19 for transmission to the logic board (FIG. 5).

Each signal goes low for "current present" with a minimum resolution of 10 amperes. A reduced resolution can be obtained by increasing the threshold level potentiometers 38,39.

Industrial Applicability

Preferably, current flow through the commutation/snubber capacitor device is sensed by means of a Hall effect sensor located around a conductor which extends from the commutation/snubber capacitor device to a point between the second and third thyristor switches. As current flow through the second thyristor switch 7 causes current flow through the said conductor in a direction opposite to the direction of flow of current caused by current flow through the third thyristor switch 10, the direction of current across the commutation/snubber capacitor device 9 can be sensed so as to be utilized by the control means to provide an interlock to prevent the first and third thyristor switches 5,10 from conducting when the second thyristor switch 7 is conducting and to prevent the first and second thyristor switches 5,7 from conducting when the third thyristor switch 10 is conducting.

It is essential to control current through the first thyristor switch element 5 to match the commutation capacitor status. This supervision task is the most critical of the interlock protection system. Two necessary elements are available to ensure commutation, i.e., a. The value of negative charge ($V_{CAP}$).

b. A continuous monitor of the first thyristor switch element 5 current.

Referring to the circuit diagram of FIG. 5, these two circuit elements are fed to the comparator 40. The output of the comparator 40 pin 1 is buffered, then pushed through the integrated circuit 41 direct to the second thyristor switch element 7 firing circuit. This function is not impeded in any way by other considerations. As soon as the maximum value of current is reached against its set value of commutation capacitor negative voltage, the second thyristor switch element 7 is fired which force commutates the first thyristor switch element 5 into the off state.

At 1000 amperes the IC25 pin 7 output is 5 volts. If this current is switched off, then the commutation capacitor voltage, when charge reversed, will reach minus 600 volts corresponding to 10 volts at the output of the comparator 28 pin 7. This point is, however, clamped by the diode 42 at 5 volts. By implication only 300 volts on the capacitor 9 must be capable of commutating the 1000 ampere first thyristor switch element 5 current. This is in fact the case, and from system tolerancing a value of 250 volts is sufficient to commutate the 1000 amperes. A scaling factor is essential for satisfactory operation of the motor.

During operation when one phase of the motor is energized, the current does not rise linearly with time since during rotation the inductance is increasing. To maintain the energy expression at the end of the defined conduction period, the current value may be substantially less than the value at the beginning. The energy expression is the amount of energy that must be stored in the communication capacitor to ensure commutation of the associated thyristor. There must therefore be a suitable ratio between the available commutation energy from the smaller current to allow the larger current to be safe at the beginning of the next cycle. The 1000 ampere - 250 volts scaling ensures this requirement.

In FIG. 5, inputs are at the left moving through, mostly sequential logic, to outputs on the right. The top left-hand side is the machine winding current input which is optically coupled via an analog coupler configuration, 23,25,40. Next, $V_{CAP}$, the positive capacitor voltage measurement, is transferred across by a defined operating current/hysteresis digital opto-coupler 43.

The $V_{CAP}$ input also feeds the negative capacitor voltage analog coupler 29, which is of the same configuration as the coupler 23. The inputs 18 and 19 are "current present" signals in the third thyristor switch element 10 and the second thyristor switch element 7. Finally, the firing signals from the processor inputs 15 and 15' are optically coupled using a digital opto-coupler 45.

Three outputs 63,64,65 are located on the right hand side of the circuit diagram which are the logic output pulses to the thyristor switch element firing circuits (FIGS. 2 and 3). These are conventional circuits and will not be further described, but it should be noted that the firing circuits of FIG. 3 used for the second and third thyristors 7 and 10 are transformer-coupled to the respective thyristors. The LED's at the firing circuit input are in series with the output connections located at the respective IC's 46. The monostables 47,48 are connected to the nonretriggerable mode to supply a 50 S output pulse. Before the pulse is transferred to the output buffer, a respective AND gate 49 is inhibited by a power up delay IC50. This AND gate group is also inhibited during the firing of any one monostable 47,48, i.e., the Q output of the fired monostable is fed to the remaining two AND gates, inhibiting coincident firing. The primary steering gates for the output pulse activation are 51,52,53. It can be seen that the input firing pulse from the processor inputs 15,15' is fed to all three gates. As the various remaining input conditions at these IC's go to the "allow" state, then a thyristor switch element firing pulse is produced. Overall, the system is self synchronous, that is, as the various circuit conditions are satisfied, the next thyristor in the sequence is fired.

At the instant of switch on with the firing input low, nothing happens at the firing outputs. The delay IC50 power up inhibit suppresses any start up monostable periods or switch-on transient effects.

During the setting up procedure, the output at IC25 pin 7 is adjusted to 0.5 volts DC at zero input current to bias the current limit comparator pin 1 into the inhibit state.

The initial conditions are then:

| Current limit gate 51/2 | low |
| Negative capacitor voltage gate 52 | high |
| Positive capacitor voltage gate 52/2 | high |
| Thyristor switch element 10 current gate 52/5 | high |
| Thyristor switch element 7 current gate 52/12 | high |

If the firing signal (G,H) goes high, then only the second thyristor switch element 7 can be fired via IC52 (the remaining steering gates are inhibited). The equivalent circuit of the motor, capacitor, and the second thyristor switch element 7 at this time is a series $L_M C$ circuit with a series switch.

$L_M$ is the motor inductance.

C is the commutation capacitor 9.

The circuit is under-damped with a high Q such that the voltage on the capacitor targets for twice the supply rail, e.g., 140 volts DC. This is clearly shown in FIG. 6 during the initial two time divisions. It must be remembered, however, that the period of this transition and the peak current value are influenced by the inductance $L_M$. This inductance can be in the range 0.2 mH to 1.6 mH. At the high inductance value, the period is longest and the peak current at its minimum.

Should the peak current be insufficient to operate the second thyristor switch element 7 sensor, then the second and third thyristor switch element 7,10 inhibit and natural commutation period cannot be ensured before the next stage of the process. A delay period sufficient to cover this case is introduced by the resistor 30/capacitor 31 circuit. Should the second thyristor switch element 7 signal be available, then capacitor 31 is reset. This mechanism ensures that the long delay of the resistor 30/capacitor 31 circuit is only utilized at the instant of starting from zero at the high inductance position. If this delay was permanent, then the maximum clock rate would be unacceptably reduced. FIG. 6 indicates the absence of the second thyristor switch element 7 signal during the first thyristor switch element 5 firing.

Should the second thyristor switch element 7 signal be available (it does have a minimum measurable value of approximately 10 amperes), then to ensure that sufficient time is available for the second thyristor switch element 7 to naturally commutate and inhibit the next stage of the commutation process, a variable delay is imposed on the trailing edge by the resistor 56/capacitor 57 circuit ranging from 50-250 s.

As soon as the resistor 30/capacitor 31 circuit period or the second thyristor switch element 7 signal extension is completed, the next allowed state is to fire the third thyristor switch element 10 to reverse the charge on the commutation capacitor. This is clearly shown on FIG. 6 in time division 3. The resulting third thyristor switch element 10 signal inhibits firing the first thyristor switch element 5 of the second thyristor switch element 7. It may be observed that the next capacitor voltage transition is positive. At the completion of the third thyristor switch element 10 current signal, the comparator 28 pin 1 has recycled the second thyristor switch element 7 firing pulse because the negative voltage was below 100 volts after charge reversal. The new positive voltage is 180 volts which when charge reversed now gives −1540 volts.

This may appear a small advantage. However, there are intermediate positive supply voltages from, for example, a low battery or a long delay between firing pulses that can allow the charge on the commutation capacitor to leak away via the 30 K resistor. This internal recycling to achieve a substantial negative voltage for principal current commutation avoids resolution problems at low voltages. It prepares the commutation capacitor for a significant first pulse value of main current. Once the capacitor is charged to a suitable value of negative voltage, the first thyristor switch element 5 is allowed to fire. The source of this firing pulse edge is IC51 pin 13, which is directed to monostable 47 pin 5 to create a 100 s minimum on period in which the first thyristor switch element 5 cannot be turned off from the processor firing signal. IC59 supervises this turn off process, which occurs if the duration is greater than 100 s from the back edge of the processor firing pulse.

If the process firing pulse remains high, the current in the machine rises until the current limit system turns off the first thyristor switch element 5 by firing the second thyristor switch element 7 via a differentiator resistor 60/capacitor 61 circuit at the input of IC41 pin 9.

During the turnoff process, the commutation capacitor 9 becomes a snubber capacitor and goes to 2 V battery and acquires the magnetic energy of $\frac{1}{2} LI^2$ contributed by the machine leakage inductance (L). This positive voltage is charge reversed and the system becomes a self synchronous chopper. This mechanism is shown in FIG. 7.

FIG. 7 shows the operation from a low positive capacitor voltage which is above the positive capacitor voltage sensor 'low' level. It can be seen that the capacitor voltage is reversed to an insufficient negative level. The cycle is repeated as in the previous text until the negative voltage is acceptable. At this point the first thyristor 5 is allowed to be fired, then turned off in this case by the current limit system. The new positive voltage is charge reversed and the cycle repeated. In FIG. 7 a firing pulse at the 15,15' logic input occurs at t=o and remains high until t+7.4 time divisions.

The described embodiment of the present invention provides a motor drive circuit for a motor having a bifilar winding, in which a current sensing device aids in sequencing the condition of a plurality of thyristor switches.

Other aspects, objects, advantages, and uses of this invention can be obtained from a study of the drawings, the disclosure, and the appended claims.

I claim:

1. An electrical drive circuit for a variable-speed switched reluctance motor for connection to a DC power source, and said motor having a bifilar winding, said bifilar winding having a main winding (3) and an auxiliary winding (3'), comprising:

first and second voltage/current lines (1,2) connectable to said DC power source, one end of said main winding (3) being connected to said first voltage/current line (1);

first, second and third thyristor switches (5,7,10) each having a respective firing circuit (6,8,11) adapted to fire said respective thyristor switch (5,7,10) to conduction, said first thyristor switch (5) being connected between said second end of said main winding (3) and said second voltage/current line (2), said second and third thyristor switches (7,10) being connected in series between said second end of said main winding (3) and said second voltage/current line (2), in parallel with said first thyristor switch (5);

a commutation capacitor device (9), said commutation capacitor device (9) being connected in parallel with said third thyristor switch (10) between said second and third thyristor switches (7,10) and said second voltage/current line (2);

means (33) for sensing the direction of current flow through said commutation capacitor device (9); and control means (20) for preventing said first and third thyristor switches (5,10) from conducting when said second thyristor switch (7) is conducting and to prevent said first and second thyristor switches (5,7) from conducting when said third thyristor switch (10) is conducting, said control means (20) being connected to said sensing means (33) and to said firing circuits (5,8,11).

2. A circuit, according to claim 1, wherein said means (33) for sensing said direction of current flow through said commutation capacitor (9) device comprises a Hall effect sensor.

3. A circuit, according to claim 2, wherein said control means (20) includes means (17) for monitoring the current through said first thyristor switch element (5).

4. A circuit, according to claim 3, wherein said monitoring means (17) includes a Hall effect device (33).

5. A circuit, according to claim 3, wherein said control means (20) further includes means for monitoring the voltage across said commutation capacitor device (9).

6. A circuit, according to claim 5, wherein said commutation capacitor device voltage and said current through said first thyristor switch element (5) are delivered to a comparator, said comparator having an output adapted to control the firing of said second thyristor switch element (7), said second thyristor switch element (7) being fired when the value of current through said first thyristor switch element (5) is at a maximum value relative to the set value of said commutation capacitor negative voltage, whereby said first thyristor switch element (5) is force commutated off.

* * * * *